United States Patent [19]

Liesaus

[11] 4,378,379

[45] Mar. 29, 1983

[54] MEAT PRODUCT, AND METHOD OF ITS MANUFACTURE

[75] Inventor: Erwin Liesaus, Billerbeck, Fed. Rep. of Germany

[73] Assignee: Liesaus Fleischwaren GmbH & Co. KG, Billerbeck, Fed. Rep. of Germany

[21] Appl. No.: 272,365

[22] Filed: Jun. 10, 1981

[30] Foreign Application Priority Data

Jun. 10, 1980 [DE] Fed. Rep. of Germany ....... 3021769

[51] Int. Cl.³ .............................................. A23L 1/31
[52] U.S. Cl. ................................... 426/272; 426/641; 426/513; 426/266
[58] Field of Search ............... 426/264, 265, 266, 272, 426/641, 513

[56] References Cited

U.S. PATENT DOCUMENTS

| | | | |
|---|---|---|---|
| 2,388,823 | 11/1945 | Britt | 426/272 |
| 3,075,843 | 1/1963 | Maas et al. | 426/272 |
| 3,076,713 | 2/1963 | Maas | 426/272 |
| 3,238,046 | 3/1966 | Komarik | 426/272 |
| 3,499,767 | 3/1970 | Schlamb | 426/272 |
| 3,567,464 | 3/1971 | Stallons | 426/272 |

OTHER PUBLICATIONS

Komarik, S. L., et al., "Food Products Formulary," vol. 1, Meats, Poultry, Fish, Shellfish, The Avi Publ. Co., Inc., Westport, Conn., 1974, pp. 24 and 25.

*Primary Examiner*—Robert A. Yoncoskie
*Attorney, Agent, or Firm*—Frishauf, Holtz, Goodman & Woodward

[57] ABSTRACT

A pork meat product resembling lean ham or the like is prepared by utilizing essentially scrap meat pieces or chunks, and pork belly wherein the pork belly is deboned and gristle and cartilage removed, as well as a major portion of the fat therefrom to result in a slab (10) of rind (12) and a thin layer of fatty tissue (14). This slab is treated in a pickling solution in a drum where it is gently massaged to break down the meat protein contained therein which will form a sticky mass (16). The meat chunks or pieces (18) are placed on the sticky mass (16) and adhered thereto, the sticky mass being coagulated by cooking in a cooking bag.

The resulting product can be smoked, cooled, and then can be packaged, for example in a plastic foil, resulting in a product resembling cooked ham and of essentially comparable quality.

7 Claims, 1 Drawing Figure

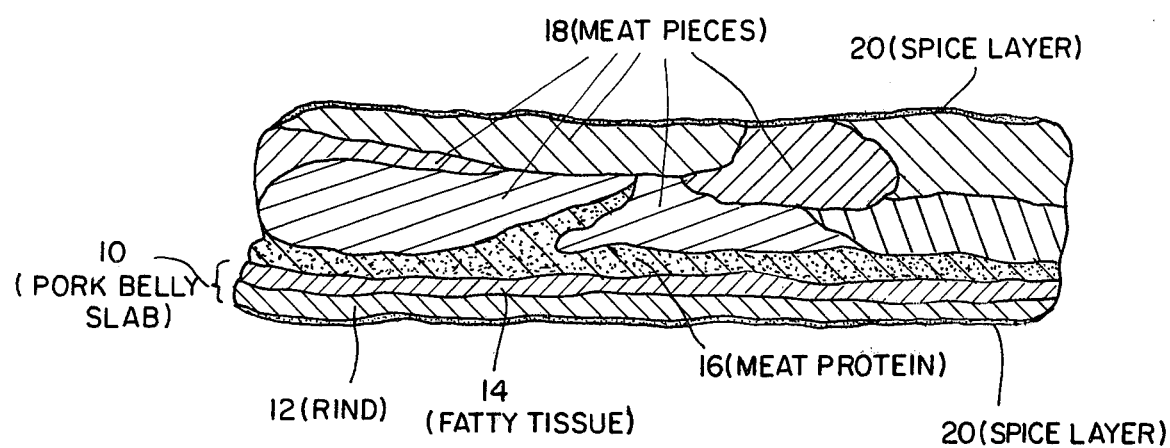

MEAT PRODUCT, AND METHOD OF ITS MANUFACTURE

The present invention relates to meat products, and more particularly to a meat product made of pork, which utilizes pork meat scraps to provide a product to the consumer comparable to high-grade lean ham, and to a method of its manufacture.

BACKGROUND

When manufacturing meat products made of pork, a good deal of scrap meat results which is difficult to market or which can be sold only at a low price, although the particular meat scraps are high-grade lean meat. Products of this type particularly are meat belly portions, remnants of ham and pork shoulder, and other parts in which meat pieces are cut when making or preparing ham, shoulder or other pork products. It is difficult to make sausages or cold-cut products from such meat scraps, since these meat products contain bone, are difficult to be handled, and result in meat pieces of varying fiber orientation.

THE INVENTION

It is an object to provide a meat product which can utilize the small meat pieces of high-grade pork and to provide an overall high-grade pork product, and a method for its manufacture.

Briefly, a base slab of pork belly is used, from which ribs and cartilage have been removed, and a portion, preferably a major portion, of the fat layer adhering thereto, to result in a lean slab and rib-free, cartilage-free pork belly. The pork belly so obtained is then treated to break down the meat protein therein, which will form a sticky, highly adhesive layer on the skin or rind itself, and the meat pieces are then adhered directly to the rind with the small layer of fat thereon by the adhesive properties of the broken-down meat protein.

For appearance and taste, the resulting product can be smoked, provided with a spice layer or the like, and packaged for sale in a sealed plastic package.

DRAWING

The single FIGURE is a highly schematic cross-sectional view through the meat product.

The meat product, generally, has a pork belly slab 10 which is formed by the rind or skin 12, a thin layer of fatty tissue 14 and a layer of meat protein 16 which is obtained from the protein within the rind and fatty tissue still present in the meat product. While the drawing shows the layers discretely separate, in actuality they merge into each other, and the strict definition or boundary junction does not pertain. Adhered to the base layer formed by the rind 12 and the fatty tissue 14 are pieces and chunks of meat 18, the broken-down meat protein 16, permeating the chunks or pieces 18 of the meat and adhering the meat pieces and chunks (18) together and to the base layer 12. A spice layer 20 can be placed over and beneath and, if desired, all around the finished meat product. The spice layer 20, simultaneously, may be decorative, provided with coloring matter for appearance, and additionally, or instead thereof, provide spice for taste and may include, for example, pepper, paprika, or the like. The thickness of the layer formed by the meat chunks or pieces 18 preferably is a multiple of the pork belly 10, from which the bone and cartilage and undesired fatty tissue have been removed.

The resulting meat product in accordance with the invention, both in taste as well as in appearance, is similar to high-quality cooked ham, so that the price which can be obtained therefor is substantially higher than that which could be obtained for the starting materials separately. The resulting meat product is easy to handle and to cut, for example for use as cold-cuts, in sandwiches, or the like.

Method:

The starting material for the meat product is pork belly. The ribs from the pork belly are removed, and cartilage tissue and gristle are removed, for example by cutting it out. The skin and the immediately adjacent layer, collectively the rind, remain. The major portion of the originally present fat layer is then cut off, leaving a thin layer 14 of fatty tissue on the rind 12. The resulting rind and thin layer of belly pieces are then cut into small pieces suitable for sale, for example rectangles of 15×20 cm, that is, roughly 6"×8".

The belly portions so prepared are then treated with spiced pickling fluid, for example by injection, and then placed into a rotating drum which also contains the same or other pickling fluid. The rind elements are there subjected to gentle mechanical kneading. Suitably, the belly pieces are gently massaged for about 10 hours in the drum; the drum need not rotate continuously, but may operate in a rumbling manner, or be otherwise constructed to treat the rind and fatty tissue, attached thereto, gently, but effect a kneading action. The effect of this kneading action, that is, the treatment in the drum, is to break down or open up the meat protein in the pieces or chunks of the belly. The result will be a sticky mass at the side of the skin which was the inside of the animal. Meat chunks and bits, preferably prepared meat bits from which cartilage and gristle have already been removed, readily adheres to this sticky mass formed by brokendown meat protein. Preferred parts for use are elements, chunks and pieces of pork hindquarter, that is, ham, or shoulder butts. The meat belly elements, thereby, are built up with bits, chunks and pieces of meat to a thickness which may be approximately double to three times its original thickness. Preferably, the meat which is applied to the belly by adhesion by meat protein components is lean. The pork belly with the so applied, preferably lean, pieces of meat is then covered with a coating 20 of spice and placed in a cooking bag or envelope, where it is placed in a cooking cabinet until it is cooked and done. The heat acting on the composite of the rind, fatty tissue and meat pieces will act on the meat protein therein to coagulate the meat protein, and thereby strongly adhere the meat pieces or chunks 18 which were applied to the rind 12 to completely bind and bond together the meat chunks or meat pieces 18 to the belly portion 10.

After cooking, the cooking bag is removed. The thus obtained spiced belly, if desired, and preferbly, is smoked in hot smoke. After cooling, for about 10 hours at about 4° C., the ready meat product can be packaged for shipment, for example by placing into and sealing it in a plastic foil bag.

The ready-to-eat, finished product, before being packaged, is shown in the figure. The meat chunks 18 are adhered to the belly portion 10 by the coagulated meat protein 16 of the belly portion which was broken up and formed into the sticky mass by kneading in the pickling solution.

The meat product is quite lean and similar to high-quality cooked ham and is eminently suitable for use as cold-cuts, for sandwiches, as an additive to other foods, and the like. The product can be made in smaller or larger pieces and, if desired, in a standardized size, for example of a standard rectangular size, thus is easily handled, and economically stored and shipped, while being readily cut and sliced for serving.

A suitable pickling solution to break up the meat protein in the tumbling drum comprises 100 liters water, 1 kilogram sugar, 10 kilograms of a commercially available pickling salt (which may comprise up to about 2 percent $NaNO_3$, and other known, permitted additives), and 5 kilograms of a commercially available cooking pickling composition, as known in the art.

A suitable cooking time is about 4 hours, at a temperature of 78° C. (to obtain a core temperature of about 70° C.), and under atmospheric pressure in a cooking cabinet.

The cooking bag is used essentially to preserve the shape of the belly portion 10 and the meat pieces 18 which are placed thereon before the meat protein layer has completely coagulated and adhered the chunks 18 together and to the belly portion 10.

I claim:

1. Meat product comprising:
   a lean slab (10) of rib and cartilage-free pork belly (10) including the natural skin (12) of pork belly meat and formed by removal of ribs, cartilage, and at least a portion of adhered fat from a piece of pork belly;
   and a plurality of pieces (18) of pork meat adhered to the slab (10) and including the skin (12) by coagulated meat-based protein, said pieces being adhered to the inner side of the skin.

2. Meat product according to claim 1, wherein a spice layer (20) is provided, applied over at least a portion of the surface of the meat product.

3. Method of making a meat product which comprises a lean slab of rib and cartilage-free pork belly (10) and a plurality of pieces or chunks of pork meat (18) adhered to said slab, comprising the steps of:
   providing a piece of pork belly (10) including the skin;
   removing bone, cartilage and gristle from the pork belly;
   removing at least a portion of the fatty tissue from the pork belly while leaving the skin;
   treating the so resulting lean, rib-free and cartilage-free pork belly slab (10) with a pickling solution nd kneading said slab to break down meat protein contained therein and form an adhesive mass (16) on the rind (12) of the slab;
   placing pork meat chunks or pieces (18) on the adhesive mass (16);
   and coagulating the meat protein by heating the composite slab (10) including the skin and meat pieces thereon to form a single compact adhered composite meat product.

4. Method according to claim 3, further including the step of applying a layer of spice (20) over at least a portion of the surface of the slab and the meat adhered thereto.

5. Method according to claim 3, further including the step of smoking the slab (10) and the meat pieces or chunks (18) applied thereto.

6. Method according to claim 3, wherein the step of treating the pieces of pork belly and kneading the pieces comprises gently massaging said pieces in a tumbling drum for at least several hours to break down the meat protein therein.

7. Method according to claim 3, wherein the step of coagulating the meat protein comprises the step of introducing the slab (10) with the meat chunks or pieces (18) placed thereon into a cooking bag;
   and heating the slab with the meat chunks or pieces (18) applied thereto.

* * * * *